United States Patent [19]

Flis

[11] Patent Number: 4,492,037

[45] Date of Patent: Jan. 8, 1985

[54] LIQUID LEVELING DEVICE

[76] Inventor: Norman H. Flis, Box 132, R.D. #7, Gibsonia, Pa. 15044

[21] Appl. No.: 558,903

[22] Filed: Dec. 7, 1983

[51] Int. Cl.³ .............................................. G01C 5/04
[52] U.S. Cl. ...................................................... 33/367
[58] Field of Search .......................................... 33/367

[56] References Cited

U.S. PATENT DOCUMENTS

| 124,389 | 3/1872 | Rohrer | 33/367 |
| 397,695 | 2/1889 | Clough et al. | 33/367 |
| 2,566,102 | 8/1951 | Waldo | 33/367 |
| 2,755,560 | 7/1956 | Spaeder | 33/377 X |

FOREIGN PATENT DOCUMENTS 626554  2/1936  Fed. Rep. of Germany ........ 33/367

Primary Examiner—Harry N. Haroian

[57] ABSTRACT

A liquid leveling device comprising a length of flexible transparent tube and a liquid control assembly at each end of the tube for preventing inadvertent leakage of liquid from the tube end but to maintain atmospheric communication with the liquid in the tube during use of the leveling device. The liquid control assembly includes a closed hollow body elongated along a central axis which is normally vertically oriented and having valve structure operatively associated with an air passage through the body. Contained within the body is a float means responsive to liquid flowing from the tube into the body which operates the valve structure and closes the air passage, preventing liquid leakage from the leveling device. The body also contains a ball member normally supported on a sloped inside surface of the body whereby inadvertent tilting of the body will cause the ball to urge the float member to actuate the valve structure and thereby close off the air passage until the body is returned to its vertical operating position.

5 Claims, 4 Drawing Figures

LIQUID LEVELING DEVICE

BACKGROUND OF THE INVENTION

This invention relates generally to a leveling device of the type using a flexible transparent hose or tube substantially filled with water or colored antifreeze solution, of the type commonly used in basic construction work and employing the principle of liquid seeking its own level, to establish two or more separate points at an identical level or vertical height. This invention relates more specifically to the provision, in combination with a flexible transparent tubular liquid level, of a liquid control assembly at each end of the tube which is adapted to automatically prevent inadvertent leakage of liquid from the tube and nevertheless permit ease of use of the entire assembly as a leveling device.

In initiating any type of structural work, whether it be a building foundation, installation of a swimming pool, pipe fitting, or ceiling installation, a primary operation is to establish true level or extend a level line between a first and second point. It is common procedure to do this by establishing a first point or mark on, for example, a stake or batter board and then to locate a second point or mark at some distance away from the first mark. This is accomplished by utilizing an elongated relatively small-diameter flexible tube, usually clear plastic, having both ends open to the atmosphere and having the tube substantially filled with liquid. One end of the tube is placed in vertical orientation across the first mark and held in that position while the second end of the tube is vertically oriented at the anticipated general location of the second mark and is adjusted vertically until the end of the liquid column at the first end of the tube is perfectly aligned with the first mark. Then, the end of the liquid column at the second end of the tube establishes the location of the second mark which is accurately level with the first mark.

There are variations of the basic tubular liquid leveling device, one of which includes a reservoir at one end of the tube which can be placed centrally and stationary within the intended area of construction. Then, a plurality of successive marks can be placed outwardly from the reservoir, in registration with the end of the liquid column in the outer end of the tube, and all marks so placed will be level with each other.

In utilizing the known common liquid leveling devices it is necessary to have a removable plug in the tube end which is removed during the leveling operation and then replaced to prevent leakage of the liquid from the tube when the tube end is dropped to the ground or the tube is stored for later use. In the simplest non-reservoir version of the liquid leveling device heretofore described, it is necessary to utilize a plug at each end of the tube, and such plugs are often lost or inadvertently dislodged.

BRIEF SUMMARY OF THE INVENTION

The present invention comprehends the provision of a liquid control assembly for use in combination with a liquid leveling device of the type including a transparent flexible hose or tube, with the liquid control assembly being capable of maintaining atmospheric communication with the liquid level in the hose during use and automatically closing off such atmospheric communication, to prevent liquid leakage, when the leveling device is dropped or laid aside or stored.

The liquid control assembly is adapted to be connected to the end of the transparent flexible hose. It comprises a hollow closed body elongated along a central axis which is normally vertically oriented during use. The closed body has a lower end with an opening in sealed liquid-flow communication with the hose end whereby the closed body, during use, projects above the hose. The upper end of the closed body has an air passage therethrough enabling communication between the interior of the closed body and the atmosphere during use of the leveling device. Contained within the closed body at its upper end is valve structure operatively associated with the air passage and adapted to open and close the air passage automatically as hereafter described. Contained within the closed body is a float member which will move upwardly therein in response to liquid flowing into the closed body from the hose. The upward motion of the float member causes a pivotal lever of the valve structure to urge sealing member, which can be a ball or needle-type valve member, to sealably obstruct the air passage. Liquid would flow from the hose into the closed body to initiate the aforedescribed action if, for example, the other end of the hose was manually raised to a height considerably above the level of the closed body. When liquid drains back from the closed body into the hose, the float member moves downwardly, releasing the lever whereby the valve structure opens the air passage.

Disposed beneath the float member is a relatively heavy spherical member which normally rests on a downwardly converging sloped inner surface of the closed body. The float member normally rests on the spherical member whereby, if the closed body is tilted sufficiently away from its normal vertical orientation, the spherical member will roll axially outwardly on the sloped surface and urge the float member against the lever to seal off the air passage.

The structure of the invention also includes the provision on the closed body of a manually operable means of closing off the air passage from the outside of the closed body to facilitate storage of the leveling device in a toolbox or other suitable container whereby inadvertent jostling of the device will not result in undesirable liquid leakage.

Accordingly, from this brief summary of the invention it can be appreciated that a primary purpose of the invention is to provide a building contractor or construction worker with an improved liquid leveling device which eliminates certain problems associated with similar devices of the prior art. Plugging the flexible hose at its ends with dislodgable plugs or corks prior to storage is not required. Once the entire unit is assembled and properly filled with liquid, it is ready for immediate use at any time without need for liquid replacement. Further, it will be evident from the ensuing detailed description that the invention provides certain additional advantages not heretofore available in similar liquid leveling devices.

DESCRIPTION OF THE PREFERRED EMBODIMENTS

Figure 1:
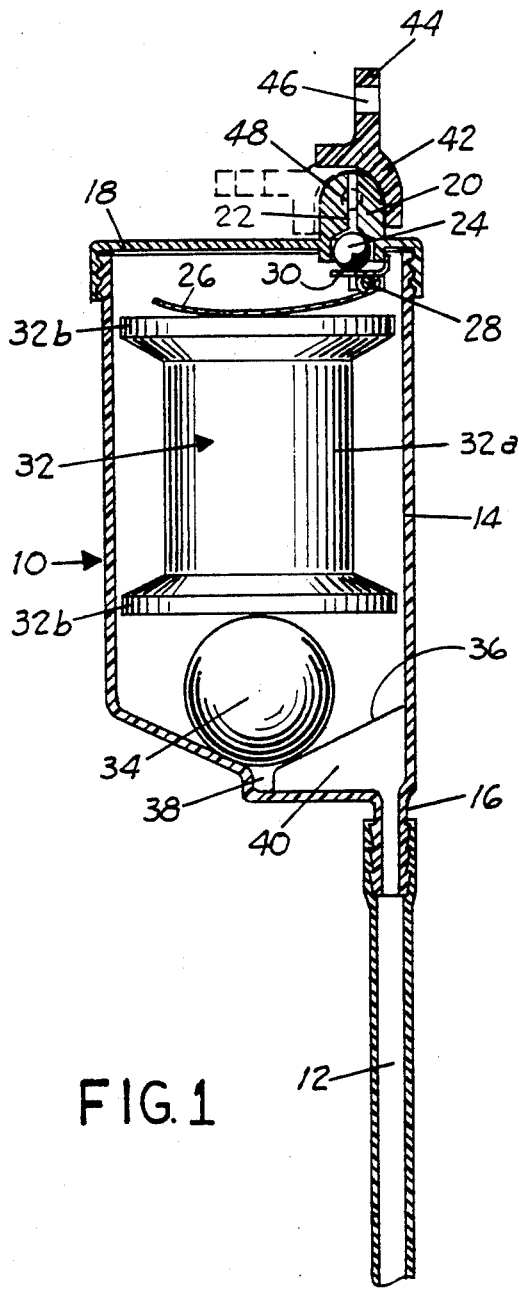
FIG. 1 is a side elevational view, in vertical section of a liquid control assembly in accordance with the present invention.
Figure 2:
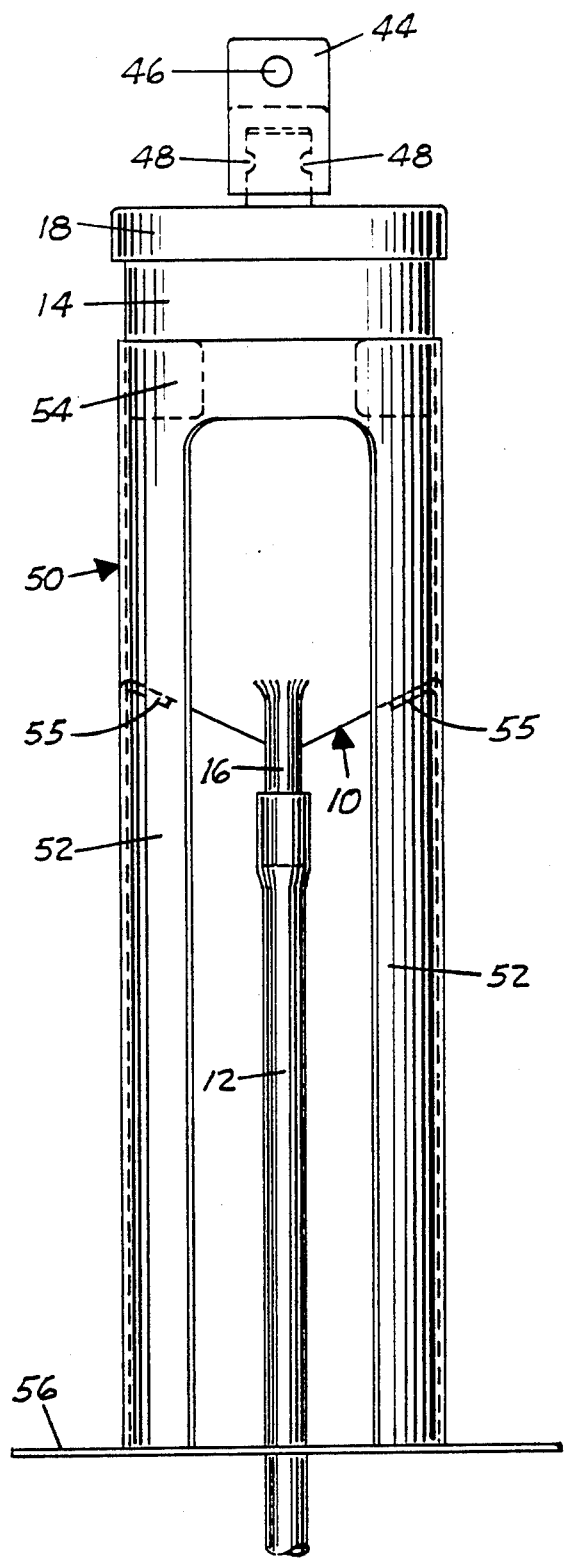
FIG. 2 is a rear elevational view of the liquid control assembly first shown in FIG. 1, here shown in combination with a removable support structure which is hereafter further described.

In FIGS. 1 and 2 there is shown a liquid control assembly 10 in liquid flow communication with a transparent flexible hose or tube 12. The assembly 10 comprises a generally cylindrical container or hollow closed body 14 having a narrowly projecting lower end nipple 16 to which is tightly affixed the end of the hose 12. At the upper end of the closed body 14 is a removable cap or lid 18 which is threadably and sealably secured to the body 14.

Integral to the lid 18 is an upwardly projecting boss 20 having a vertically extending opening or air passage 22 therethrough which is adapted to provide atmospheric communication through the lid 18 to the interior of the closed body 14. Operatively associated with the air passage 22 is valve structure including a relatively small ball member 24 which is adapted to be moved to and away from registration with the lower end of the air passage 22 in response to pivotal action of a lever 26. The lever 26 is pivotally mounted on a pin 28 and has a tang 30 supporting the ball member 24.

Mounted within the closed body 14 is a float member 32 which is preferably of a spool-like configuration with a central cylindrical portion 32a and opposite end portions 32b. The diameter of each end portion 32b is slightly less than the inside diameter of the closed body 14. The float member 32 rests upon a relatively large spherical member or ball 34. The spherical member 34 rests on an inner sloped surface 36 which converges centrally-downwardly to a central port 38 leading to a liquid flow passage 40 in communication with the hose 12.

At the upper end of the assembly 10 the boss 22 on the lid 18 has a manually pivotal closure member 42 which has an upwardly projecting hanger portion 44. The hanger portion 44 has an aperture 46 therethrough to enable hanging of the assembly 10 as will be hereafter further described.

By reference to FIG. 2 it will be seen that the manually operable closure member 42 is affixed in pivotal position on the boss 22 by means of integral inwardly-projecting tabs 48 which are rotatively secured in conformably-shaped recesses in opposite sides of the boss 22.

Figure 4:
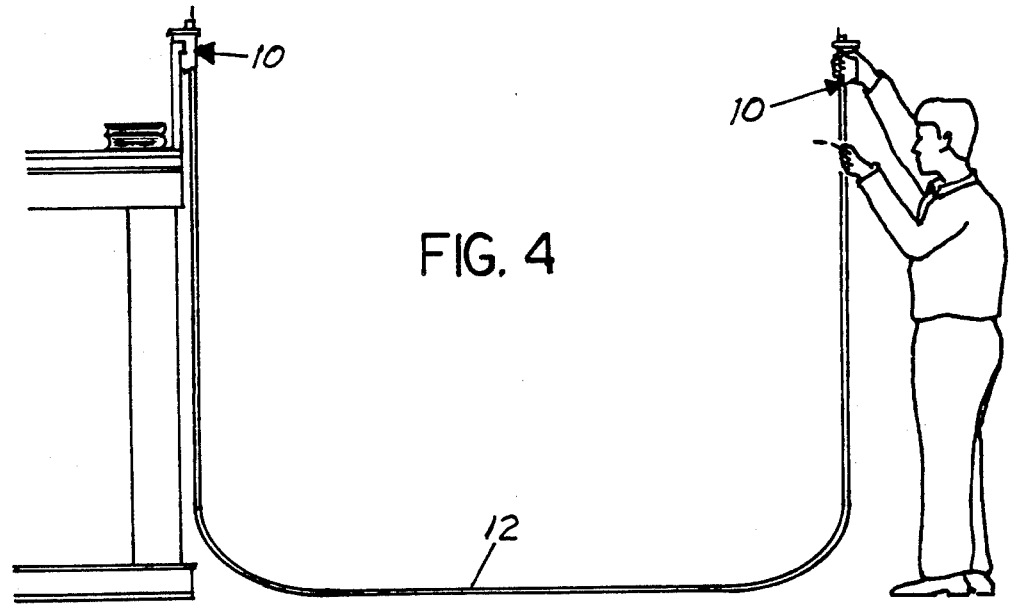
FIG. 4 illustrates a typical use of a second embodiment in accordance with the present invention.

Also shown in FIG. 2 is an optional removable backet assembly 50 for selectively supporting the assembly 10 on a flat surface. The bracket assembly 50 comprises downwardly projecting legs 52 and an encircling body-clamping portion 54. Interconnecting the legs 52 is a rigid integral foot portion 56 which projects laterally away from the hose 12 to permit a weight to be placed thereon to stablize the bracket assembly 50 on a flat surface, as shown in FIG. 4.

Having heretofore described the various elements and components shown in FIGS. 1 and 2, the use and operation of the invention can now be described with reference to all the figures of the drawings. It should, however, be first of all understood that the liquid control assembly 10 can be utilized at one end only of a tube 12 to accomplish a leveling operation, however, it is preferred that the disclosed assembly 10 be provided at each end of the tube 12 for maximum versatility in the use of the liquid leveling device. Moreover, the liquid control assembly 10 can be utilized at the outer end of a tube 12 wherein the opposite end of the tube terminates in connection with a stationary centrally-located reservoir.

Figure 3:
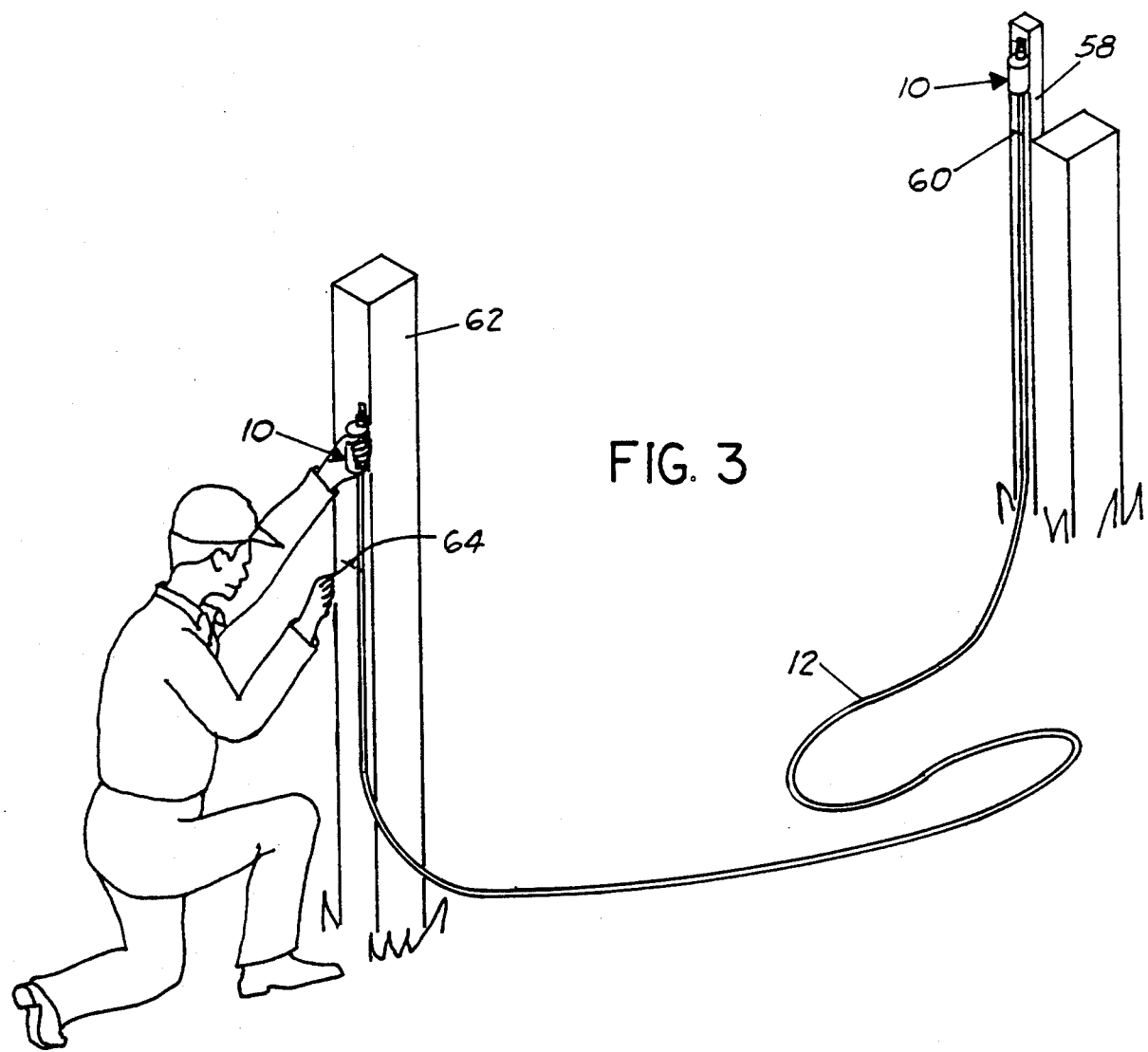
FIG. 3 illustrates a typical use of one embodiment of a liquid level device in accordance with the present invention.

Considering the embodiment shown in FIG. 3, a liquid control assembly 10 is provided at each end of a tube 12, and one of the assemblies 10 is hung on a nail or by any other suitable means, affixed to a support such as post 58, at a point somewhat above a reference mark 60 that is meant to be the starting point by which all successive points are set. In using the leveling device, the workman grasps the other end of the device to which another assembly 10 is affixed and holds it next to the vertical surface to be marked, such as post 62. By referring to the original reference mark 60 at the fixed end and adjusting in a vertical movement the assembly 10 that is being held, the liquid level in the fixed end of the tube is caused to move until it reaches the reference mark 60. It is at this point that the movable assembly 10 is held and a mark 64 is made corresponding to the liquid level in the tube. Repeating the procedure of referring to the fixed reference mark 60 and adjusting the movable assembly 10, other marks can be made at various remote locations, as desired. All marks will then be at the same level as the original mark 60. The amount of liquid maintained in the tube 12 is such that the ends of the water column at each end of the tube 12 will be a short distance below the lower end of the assembly 10 when the leveling device is positioned for use as shown in FIG. 3.

Referring now to FIGS. 1 and 3, it should be appreciated that the aperture 46 through the hanger portion 44 provides a means of hanging the assembly 10 on a nail or other means to stationarily affix one end of the liquid leveling device.

During use of any mentioned embodiment of the liquid leveling device, if the liquid control assembly 10 is dropped or purposely laid aside, whereby it is tilted from its normal vertical orientation and the assembly 10 is then at a level lower than the other end of the tube 12, liquid from the tube will flow inwardly into the closed body 14. Also, if the assembly 10 is lowered to a position below the level of the opposite end of the tube 12, even though the assembly 10 is maintained in its vertical orientation, liquid will flow from the tube 12 into the closed body 14. Whether liquid from the tube 12 enters the closed body 14 as a result of tilting or lowering of the assembly 10, the valve structure provided at the upper end of the closed body 14 will automatically react to close off the air passage 22, which normally must be open to enable natural movement of the liquid column within the tube 12 during use.

The lever 26 is pivoted upwardly whereby its tang 30 urges the ball 24 to sealably close the air passage 22 when sufficient tilting of the assembly 10 results in the spherical member 34 rolling laterally outwardly along the sloped surface 36. Lateral rolling motion of the spherical member 34 is over the slope 36, and the float member 32 resting on the spherical member 34 is thereby caused to move upwardly and raise the arm of the lever 26.

In an instance where the assembly 10 is lowered below the level of the opposite end of the tube 12, even though it is maintained in its vertical orientation, liquid will flow from the tube 12 inwardly into the closed body 14, and when the liquid within the body 14 rises a sufficient distance, the float member 32 will be buoyed upwardly to operate the valve structure and close off the air passage 22.

After the tilting or lowering actions heretofore described, if the assembly 10 is properly oriented vertically and repositioned above the level of the opposite end of the tube 12, the float member 32 and the ball 34 will resume their relative positions shown in FIG. 1, allowing the lever 26 to fall and open the air passage 22.

It is anticipated that use of the invention disclosed herein may occur in an environment wherein hanging of one end of the liquid leveling device, such as shown in FIG. 3, would be undesirable, such as when the device is used within a building where it would not be practical to hang the assembly 10 on an interior wall. In this type of environment it is preferable to be able to quickly set an assembly 10, affixed to one end of the tube 12, on a stationary raised surface, such as shown in FIG. 4. Accordingly, an optional removable support bracket 50 would facilitate such operation. As shown in FIG. 2, the support bracket 50 has a springlike encircling portion 54 into which the closed body 14 can be slidably pressed and vertically adjusted to rest on inwardly projecting fingers 55. Clearance is provided for the extension below the closed body 14 of the tube 12 connected to the nipple 16, and the laterally extending foot portion 56 interconnecting the lower ends of the legs 52 stabilizes the assembly 10 in position whereby the workman is free to appropriately manipulate the other end of the leveling device to accomplish his leveling operation.

Referring to FIG. 1, it has been determined that the angle of the sloped surface 36 relative to a line transverse to the central axis of the closed body 14 is preferably 25°, or at least within the parameters of 22°–27°, to accomplish the desired air passage closing operation when the assembly 10 is tilted from its normal vertical position. Providing the aforementioned sloped surface at the preferred angle described, assumes that the length dimension of the float member 32 (taken vertically in FIG. 1) will be such that when the float member 32 is resting on the spherical member 34 and the upper surface of the float member 32 is in contact with the lever 26, the air passage 22 will be open. Accordingly, slight lateral rolling motion of the spherical member 34 on the sloped surface 36 will be translated through movement of the float member 32 against the lever 26 to close the air passage 22.

When a liquid leveling device utilizing the liquid control assembly 10 of the present invention is taken out of use and stored, the pivotal closure 42 is preferably manually pivoted to its closed position shown by dotted lines in FIG. 1, so the hanger portion 44 extends inwardly and generally parallel with the surface of the lid 18.

Certain presently preferred forms of the invention have been heretofore described and shown, however, it is anticipated that other equivalent variations may occur to those skilled in the art in light of the above teachings. It should be understood that the illustrated and described embodiments of the invention are presented by way of example only and not in a limiting sense. It is intended that the invention disclosed herein shall comprise all of the modifications and embodiments coming within the scope and spirit of the following claims.

I claim:

1. A liquid control assembly for use in combination with a liquid leveling device including a transparent flexible hose, comprising:
    a hollow closed body elongated along a central axis which is normally vertically oriented during use and having a lower end with an opening in sealed liquid-flow communication with an end of the hose whereby the closed body projects above the hose end during use of the leveling device;
    the upper end of the closed body having an air passage therethrough permitting communication between the interior of the closed body and the atmosphere during use of the leveling device;
    valve structure operatively associated with the air passage to open and close the air passage, comprising a ball member adapted to sealably register with the air passage, a pivotally mounted lever projected into the closed body and adapted to urge the ball member into registration with the air passage, and a float member disposed centrally within the closed body to pivot the lever and thereby cause the ball member to close the air passage when sufficient liquid flows from the hose into the closed body;
    the closed body having an inner sloped surface converging towards the opening connected with the end of the hose, a spherical member normally resting on the converging surface over the opening to the hose, and the float member being disposed between the spherical member and the lever in order to translate rolling motion of the spherical member away from its normal position and thereby actuate the lever and cause the ball member to close the air passage; and
    the sloped surface of the closed body constituting an angle of between 22° and 27° taken from a line transverse to the axis of the closed body.

2. The liquid control assembly of claim 1, further comprising a manually-operable closure disposed outboard of the closed body for selectively sealing off the air passage.

3. The liquid control assembly of claim 2 wherein the manually-operable closure includes a pivotal hanger portion projecting outwardly from the closed body when the assembly is in use, and the hanger portion has an aperture therethrough to facilitate hanging of the assembly, whereby pivotal manipulation of the hanger portion causes the closure to seal off the air passage, and the hanger portion is coextensive with the surface of the closed body when the closure has sealed off the air passage.

4. The liquid control assembly of claim 1 further including selectively removable means for supporting the assembly on a flat surface during use thereof.

5. The liquid control assembly of claim 1 wherein one end of the closed body is a removable lid, and the valve structure is mounted in said lid.

* * * * *